United States Patent
Li et al.

(10) Patent No.: US 9,181,872 B2
(45) Date of Patent: Nov. 10, 2015

(54) POWER PLANT AND METHOD FOR RETROFIT

(71) Applicant: ALSTOM Technology Ltd, Baden (CH)

(72) Inventors: Hongtao Li, Aarau (CH); Alexander Zagorskiy, Wettingen (CH); Jürgen Hoffmann, Untersiggenthal (CH); Francois Droux, Oberrohrdorf (CH); Christoph Ruchti, Uster (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 393 days.

(21) Appl. No.: 13/653,217

(22) Filed: Oct. 16, 2012

(65) Prior Publication Data

US 2013/0091845 A1 Apr. 18, 2013

(30) Foreign Application Priority Data

Oct. 17, 2011 (EP) .................................... 11185447

(51) Int. Cl.
*F01B 21/04* (2006.01)
*F02C 6/00* (2006.01)
*F02C 3/34* (2006.01)
*F02C 6/18* (2006.01)

(52) U.S. Cl.
CPC ... *F02C 3/34* (2013.01); *F02C 6/18* (2013.01); *F05D 2240/40* (2013.01); *F05D 2260/61* (2013.01); *Y02C 10/04* (2013.01); *Y02E 20/14* (2013.01); *Y02E 20/16* (2013.01)

(58) Field of Classification Search
CPC .............. F02C 3/34; F02C 6/18; F02C 10/04; Y02E 20/16; Y02E 20/14; F05D 2240/40; F05D 2260/61

USPC ................. 60/715, 772, 39.5, 39.181, 39.182
See application file for complete search history.

(56) References Cited

U.S. PATENT DOCUMENTS

2007/0125063 A1   6/2007  Evulat
2008/0060346 A1*  3/2008  Asen et al. ...................... 60/274
(Continued)

FOREIGN PATENT DOCUMENTS

CN   1503996 A    6/2004
EP   1827656 A1   9/2007
(Continued)

OTHER PUBLICATIONS

Office Action (Notification of Reasons for Refusal) issued on Sep. 1, 2014, by the Japanese Patent Office in corresponding Japanese Patent Application No. 2012-228769 and an English translation of the Office Action. (12 pages).

(Continued)

*Primary Examiner* — Hoang Nguyen
(74) *Attorney, Agent, or Firm* — Buchanan Ingersoll & Rooney PC (57) ABSTRACT

A power plant includes a first gas turbine engine, a second gas turbine engine, a flue gas duct, a $CO_2$ capture system for treating flue gases from the second gas turbine engine and an exhaust system. It additionally includes at least one among a direct connection between the first gas turbine engine and the exhaust system, and a damper for on-line regulating the flue gases flow through it, a direct connection between the first gas turbine engine and the $CO_2$ capture system, and a damper for regulating the flue gases flow through it, a supply of fresh oxygen containing fluid for the second gas turbine engine.

16 Claims, 8 Drawing Sheets

(56) References Cited

U.S. PATENT DOCUMENTS

2008/0104938 A1 5/2008 Finkenrath et al.
2012/0216547 A1* 8/2012 Ll et al. ............................ 60/772
2012/0227372 A1 9/2012 Ll et al.

FOREIGN PATENT DOCUMENTS

| EP | 2 305 364 | A1 | 4/2011 |
|---|---|---|---|
| EP | 2305363 | A1 | 4/2011 |
| JP | 2008-517216 | A | 5/2008 |
| WO | 02/37587 | A2 | 5/2002 |
| WO | 2006043820 | A1 | 4/2006 |
| WO | 2008023986 | A1 | 2/2008 |
| WO | 2011/039072 | A2 | 4/2011 |

OTHER PUBLICATIONS

First Office Action issued Feb. 3, 2015 by the Chinese Patent Office in corresponding Chinese Patent Application No. 201210520630.2, and an English translation thereof.

* cited by examiner

POWER PLANT AND METHOD FOR RETROFIT

INCORPORATION BY REFERENCE

The following documents are incorporated herein by reference as if fully set forth: European Patent Application No. 11185447.7, filed Oct. 17, 2011.

FIELD OF INVENTION

The present invention relates to a power plant and a method for retrofit a power plant. In particular in the following reference to power plants with gas turbine engines in a tandem arrangement is made.

BACKGROUND

EP1827656 discloses a power plant with two gas turbine engines in a tandem arrangement and a $CO_2$ capture system.

In particular, a first engine is fed with fresh air and fuel and its flue gases are fed into a second engine together with fuel. The second engine is fed with the flue gases from the first engine and fuel; the flue gases from the second engine are then fed to the $CO_2$ capture system.

This configuration allows an increase of the $CO_2$ concentration in the flue gases supplied to the $CO_2$ capture system and, thus, makes the $CO_2$ capture system and its operation cheaper.

Nevertheless, during operation of the described power plant load regulation could be troubling.

Load regulation could cause the composition of the flue gases from the first engine to change or the requirements of the hot gases circulating within the second engine to change (the hot gases circulating within the second engine correspond to the flue gases discharged from the first engine).

When one or both of the above circumstances happen, combustion in the combustion chamber of the first and/or second engine could occur under non-optimal conditions.

SUMMARY

An aspect of the present invention thus includes providing a power plant and a method for retrofit by which the regulation of the power plant is very flexible.

Advantageously, regulation of the power plant load is extremely flexible.

This and further aspects are attained according to the invention by providing a power plant and a method in accordance with the accompanying claims.

BRIEF DESCRIPTION OF THE DRAWINGS

Further characteristics and advantages of the invention will be more apparent from the description of preferred but non-exclusive embodiments of the power plant and method, illustrated by way of non-limiting example in the accompanying drawings, in which.

DETAILED DESCRIPTION OF EMBODIMENTS OF THE INVENTION

The power plant 1 comprises, connected to one another, a first gas turbine engine 2 (reference 53 indicates the fresh oxygen containing fluid supply) and a second gas turbine engine 3. Between the first engine 2 and the second engine 3, a flue gas duct 4 is provided; this flue gas duct 4 is for at least partly sending the flue gases from the first engine 2 to the second engine 3. Typically the flue gases are sent to the inlet of the second engine (usually the inlet is at the compressor of the gas turbine engine).

The plant 1 also has a $CO_2$ capture system 5 and an exhaust system 6 (such as a stack); the $CO_2$ capture system 5 is arranged to treat the flue gases discharged from the second gas turbine engine 3.

The plant 1 has a direct connection 9 between the first engine 2 and the exhaust system 6; this connection 9 is provided with a damper 10 for on-line regulating the flue gases flow from the first engine 2 to the exhaust system 6.

In addition to the direct connection 9 or as an alternative to it, the plant 1 can have a direct connection 13 between the first engine 2 and the $CO_2$ capture system 5; this connection 13 also has a damper 14 for regulating the flue gases flow from the first engine 2 to the $CO_2$ capture system 5. The damper 14 is preferably arranged to make an on-line regulation.

The plant 1 can also have a supply 17 of fresh oxygen containing fluid (for example fresh air from the environment) for the second engine 3 between the first engine 2 and the second engine 3.

The direct connection 13 between the first engine 2 and the $CO_2$ capture system 5 is branched from the flue gas duct 4.

In order to cool the flue gases from the first engine 2, one or more coolers can be provided.

In this respect, a cooler 21 can be provided on the flue gas duct 4 upstream of the connection 13; this cooler 21 can cool the flue gases directed to the $CO_2$ capture system 5 and to the second engine 3.

A cooler 22 can also be provided on the connection 13; this cooler 22 can cool the flue gases directed to the $CO_2$ capture system 5 when the cooler 21 is not provided, or can provide additional cooling when the cooler 21 is provided.

A cooler 23 can be provided on the flue gas duct 4 downstream of the connection 13 and upstream of the second engine 3; this cooler 23 can cool the flue gases directed to the second engine 3 when the cooler 21 is not provided or can provide additional cooling when the cooler 21 is provided.

Preferably, the supply 17 of fresh oxygen containing fluid can be regulated; for this reason a mass flow control element 25, for example, a damper or a valve for regulating (for example, on-line regulating) the flow therethrough can be provided.

In order to increase the output power and efficiency, between the first engine 2 and the second engine 3 the plant 1 has a heat recovery steam generator 27 connected to a steam turbine 28 (typically with modules at high, intermediate and low pressure) to define a combined cycle unit with the gas turbine engine 2.

Between the second engine 3 and the $CO_2$ capture system 5 a cooler 30 is provided.

In addition, downstream of the second engine 3 and upstream of the $CO_2$ capture system 5, a heat recovery steam generator 31 is also provided. The heat recovery steam generator 31 is connected to a steam turbine that has modules working at different pressures, namely a high pressure or high and intermediate pressure module 32, and low pressure module 33. Also the steam turbine with modules 32, 33 defines a combined cycle unit with the gas turbine engine 3.

For example, the exhaust steam from the module 33 is supplied to a condenser 34 and the resulting condensate is then pumped back to the steam generator 31. The high pressure module 32 (but in other examples also the module 33 in replacement or in addition to the module 32) is connected to the $CO_2$ capture system 5 (to supply steam for its operation).

During operation, steam can be supplied alternatively or at the same time from the high pressure module 32 to the low pressure module 33 and/or to the $CO_2$ capture system 5.

The gas turbine engines 2 and/or 3 can have an internal recirculation line 35, for recirculating flue gases from their outlet 36 to their inlet 37.

In one possible embodiment, both the first gas turbine engine 2 and the second gas turbine engine 3 have the internal recirculation line 35 and a connection 38 is provided between them.

Additionally, the $CO_2$ capture system 5 can include a first and a second unit 5a, 5b that are connected in series. In this case, the first unit 5a is connected to the second gas turbine engine 3 and the second unit 5b is connected to the first unit 5a.

The plant 1 can have an additional flue gas duct 42, for at least partly sending the flue gases from the second engine 3 to the first engine 2. In this case the two combined cycle units are configured in a tail-head-tail-head closed arrangement, as a semi-closed cycle.

In addition, the plant 1 can also include an additional $CO_2$ capture system 43 connected to an additional exhaust system 44, the additional $CO_2$ capture system 43 for treating the flue gases from the first engine 2.

The plant 1 preferably also includes a direct connection 46 between the second engine 3 and the additional exhaust system 44, and a damper 47 for on-line regulating the flue gases flow from the second engine 3 to the additional exhaust system 44.

In addition or as an alternative to the connection 46, the plant 1 can include a direct connection 50 between the second engine 3 and the additional $CO_2$ capture system 43, and a damper 51 for regulating (preferably regulation is on-line regulation) the flue gases flow from the second engine 3 to the additional $CO_2$ capture system 43.

In addition or as an alternative to the connections 46 and 50, the plant 1 can include a supply 53 of fresh oxygen containing fluid (such as fresh air) for the first engine 2 between the first engine 2 and the second engine 3.

In the following some embodiments of the plant 1 are described in detail.

Embodiment 1

FIG. 1

Figure 1:
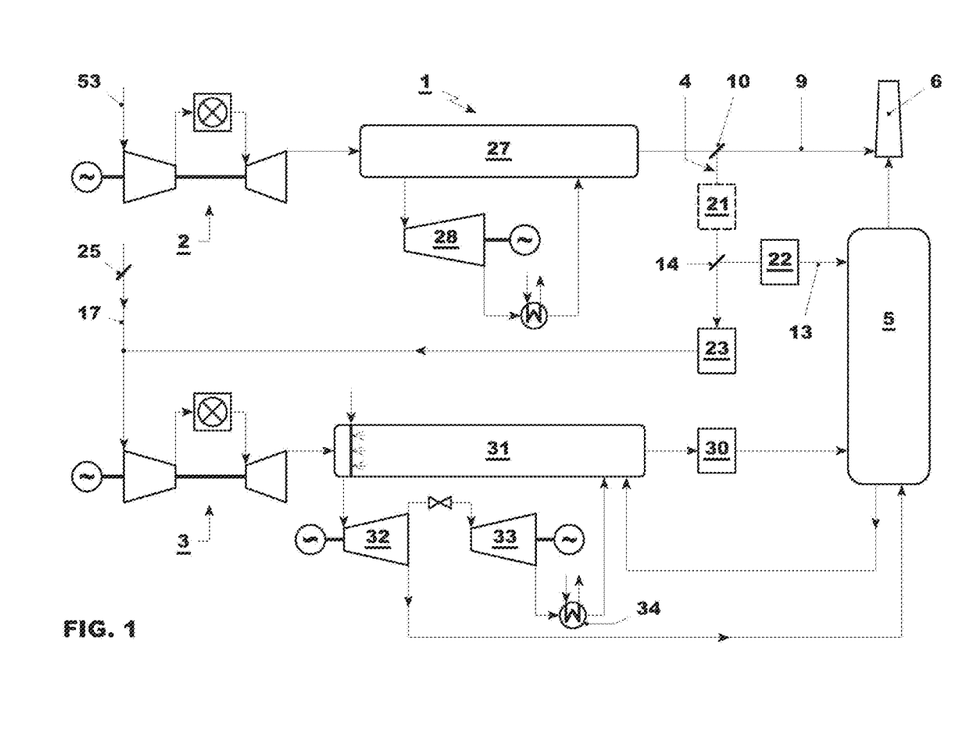
FIG. 1 is a schematic view of a power plant in an embodiment of the invention.

The plant 1 in this embodiment has the first gas turbine engine 2 and the heat recovery steam generator 27 with the steam turbine 28. Only one $CO_2$ capture system 5 is provided (with stack 6). Two coolers 22, 23 are provided (the cooler 21 shown in dashed line can anyhow be provided). The second gas turbine engine 3 has the supply of fresh air 17 and its flue gases are supplied via the heat recovery steam generator 31 and cooler 30 to the $CO_2$ capture system 5. Between the first and the second engine 2, 3 the flue gas duct 4 is provided; from the flue gas duct 4 depart the direct connections 9 and 13.

In this figure reference 53 indicates the supply of oxygen containing fluid, such as fresh air, to the first engine 2.

Embodiment 2

FIG. 2

Figure 2:
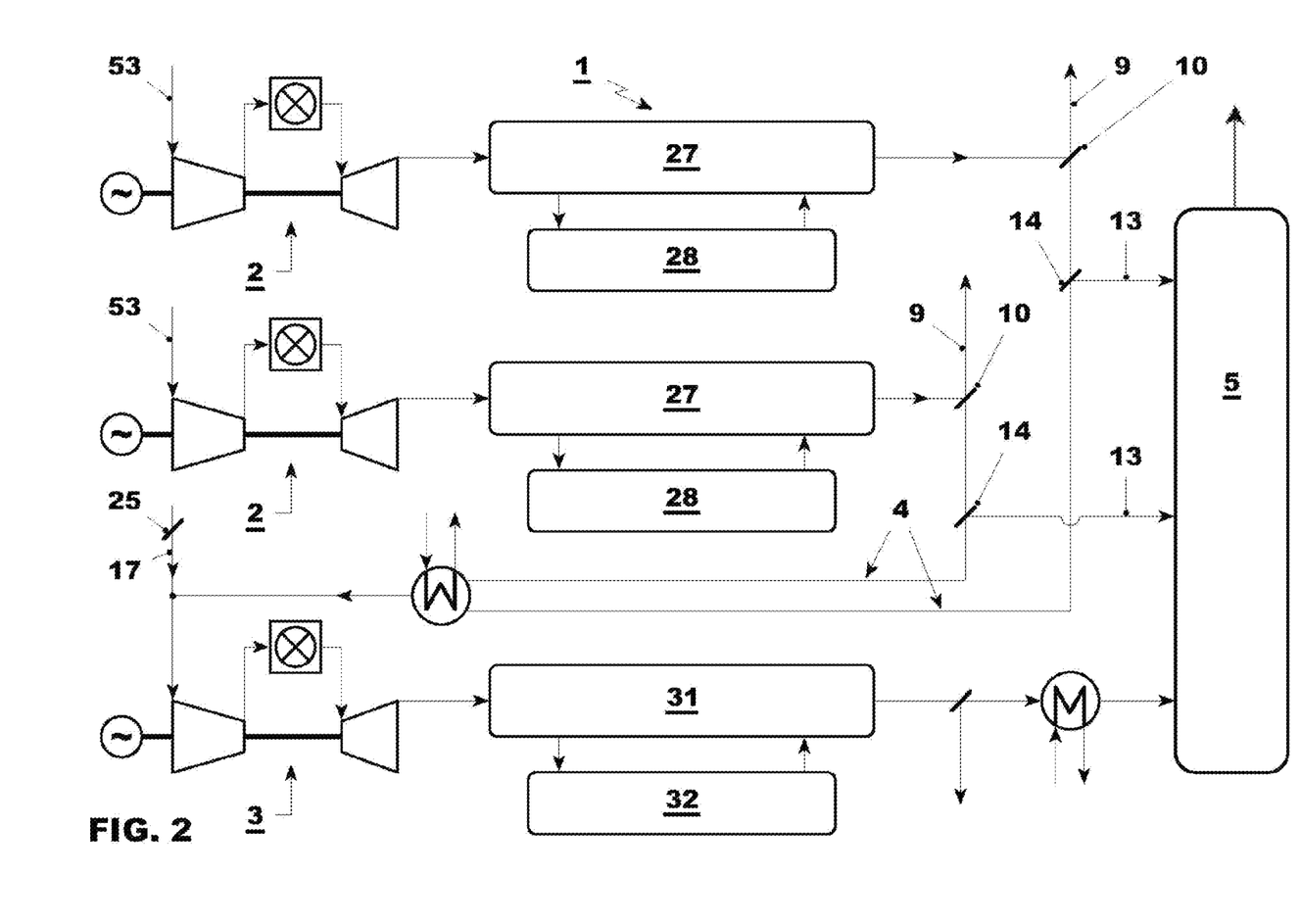
FIGS. 2 through 6 show different embodiments of the power plant.

FIG. 2 shows an alternative embodiment to that of FIG. 1; in particular in this embodiment a plurality of first gas turbine engines 2 are provided in parallel and one single second gas turbine engine is provided. Each of the two first gas turbine engines 2 has its own direct connection 9 to the stack 6 provided with damper 10 and its own direct connection 13 to the $CO_2$ capture system 5 provided with damper 14. Also in this embodiment the $CO_2$ capture system 5 is one. This scheme is useful for retrofit, to reuse existing gas turbine engines while at the same time increasing the output power of the plant 1. In addition this scheme provides a higher $CO_2$ concentration in the flue gas that is treated in the $CO_2$ capture system 5, such that a higher performance is achieved.

Embodiment 3

A third embodiment is similar to the second embodiment. In this case instead of a plurality of first gas turbine engines connected in parallel to one second gas turbine engine, one first gas turbine engine 2 is connected to a plurality of second gas turbine engines 3. This scheme is also useful for a retrofit, to reuse existing gas turbine engines while at the same time increasing the output power of the plant 1.

Embodiment 4

In a fourth embodiment the power plant includes a plurality of first and a plurality of second gas turbine engines; this scheme is also useful for a retrofit.

Embodiment 5

FIG. 3

Figure 3:
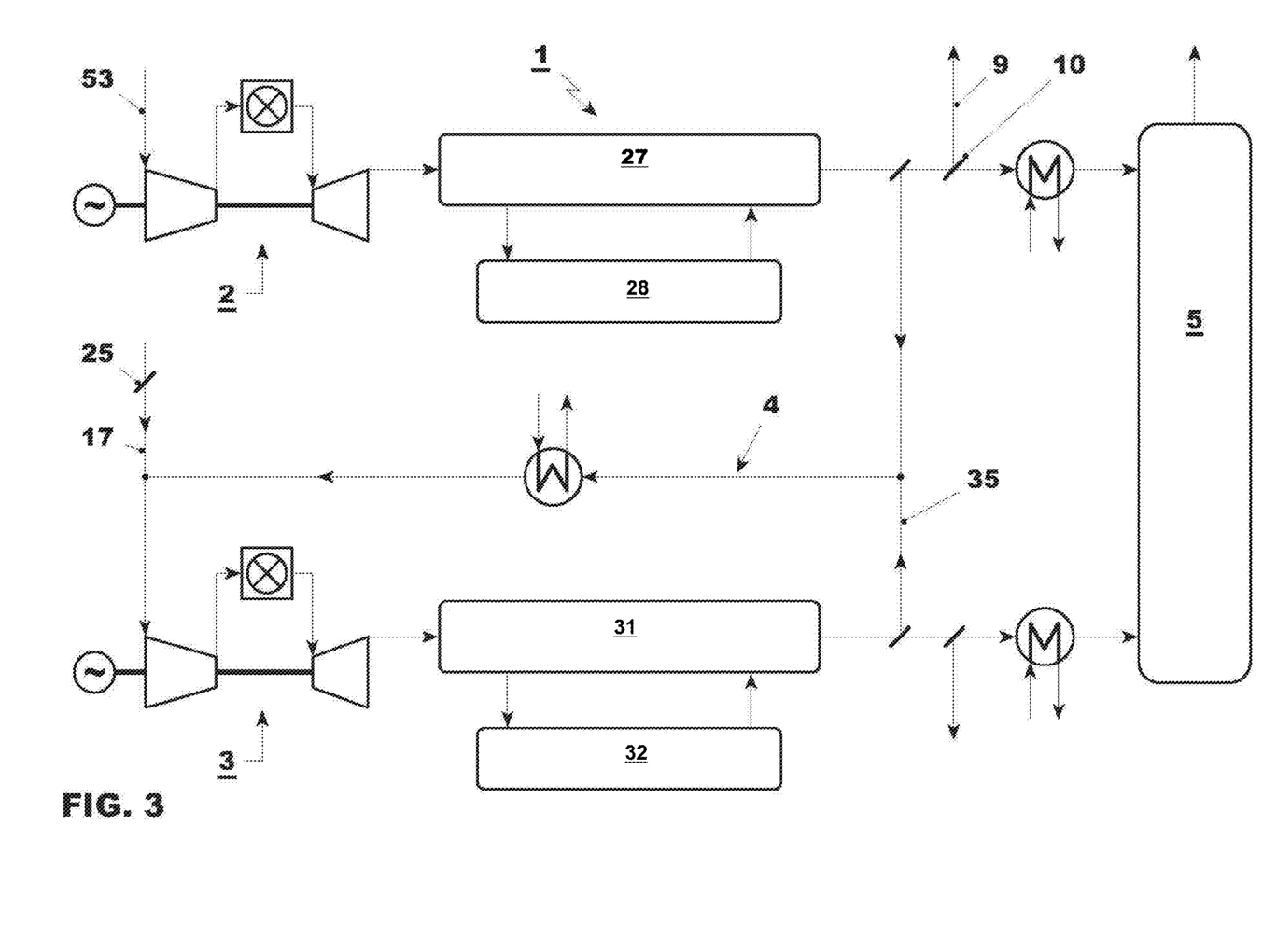

In this embodiment the internal recirculation line 35 (for recirculating the flue gases from the outlet of the second engine 3 to the inlet thereof) for the second gas turbine engine 3 is provided. In the example shown the internal recirculation line 35 is connected to the flue gas duct 4, this is anyhow not mandatory.

The internal recirculation line 35 can be useful during operation at part load.

In fact, during operation at part load, if the first gas turbine engine 2 is stopped, also the second gas turbine engine 3 could require in some cases a stoppage. This because the combustion chambers of the second gas turbine engine 3 could be optimized for operation with low oxygen concentration, such that operation with high oxygen concentration (like operation with reduced or no flue gas recirculation) could be troubling for flashback and combustion instabilities. The internal recirculation line 35 allows the oxygen concentration within the second engine 3 to be controlled.

In addition, since $CO_2$ capture systems are optimised for a given $CO_2$ concentration, operation with a $CO_2$ concentration different from the design concentration could cause reduction of the $CO_2$ capture system efficiency. Also in this case, the internal recirculation line 35 allows the oxygen concentration of the flue gases from the second engine 3 to be controlled.

Embodiment 6

FIG. 4

Figure 4:
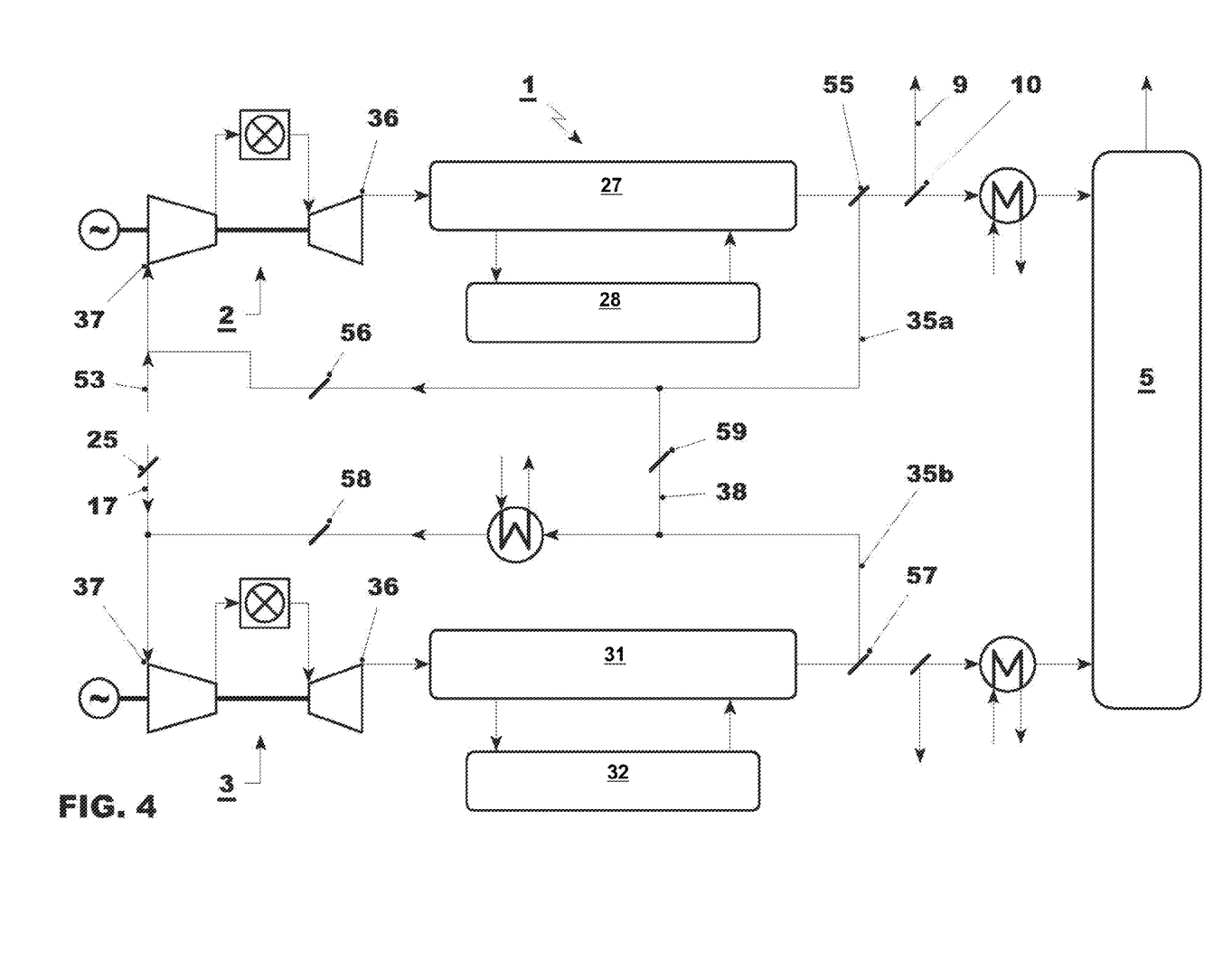

In this embodiment each gas turbine engine 2 and 3 has its own internal recirculation line 35a, 35b, with dampers 55, 56, 57, 58; the internal recirculation lines 35a, 35b are connected via a connection 38 also provided with a damper 59.

By properly controlling the dampers 55, 56, 57, 58, 59 the plant 1 can be operated:

without any recirculation at the first and second gas turbine engines 2, 3 (the dampers 55 and 57 prevent the flow from entering the internal recirculation lines 35a and 35b)

with supply from the second gas engine 3 to the first engine 2 (the dampers 57, 59 and 56 allow the flow from downstream the second engine 3 to upstream the first engine 2 and the dampers 55 and 58 prevent flow passage through the internal recirculation lines 35a, 35b);

with supply from the first gas turbine engine 2 to the second gas turbine engine 3 (the dampers 55, 59 and 58 allow the flow from downstream the first engine 2 to upstream the second engine 3 and the dampers 57 and 56 prevent flow passage through the internal recirculation lines 35a, 35b);

without any recirculation (dampers 55, 57 prevent the flow passage through the internal recirculation lines 35a, 35b).

Embodiment 7

Figure 5:
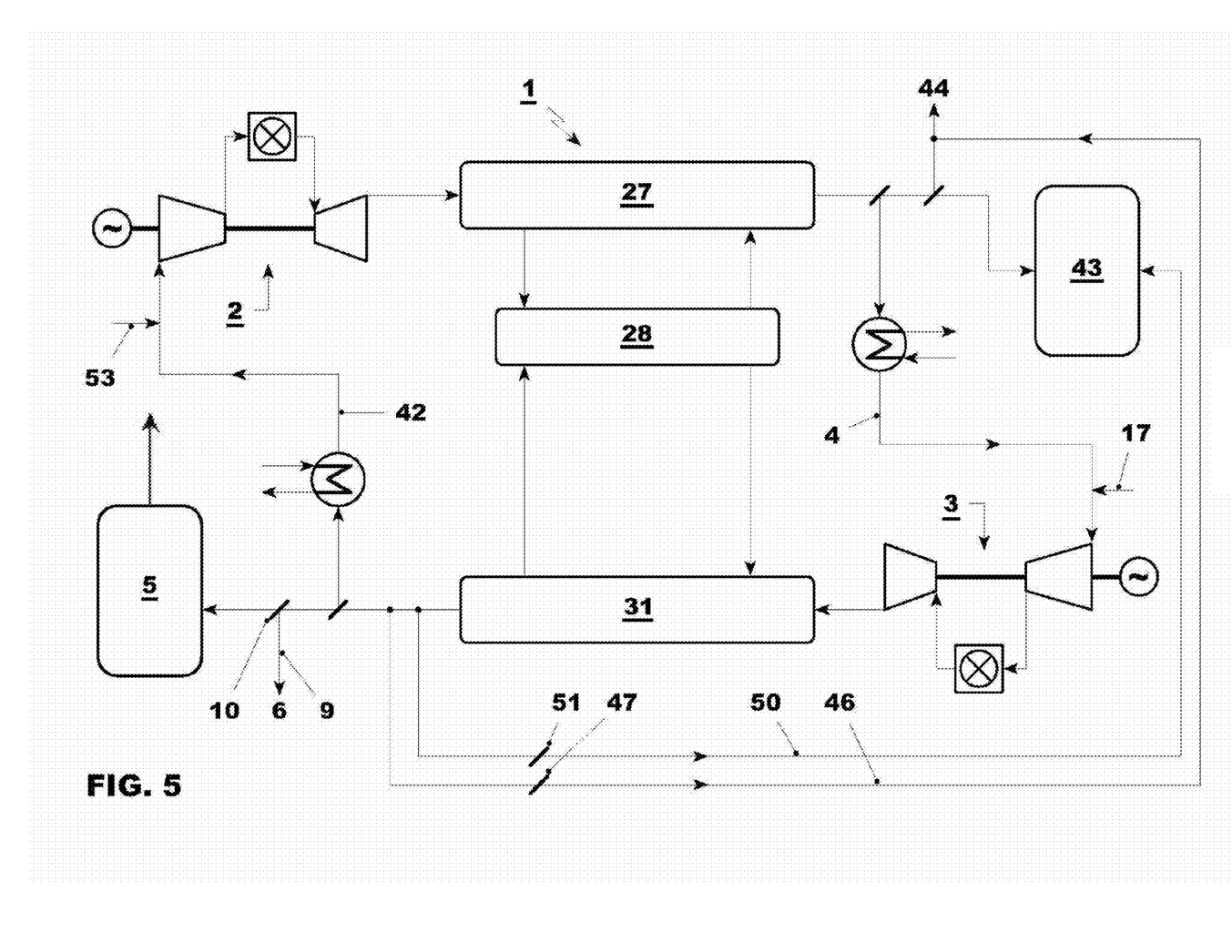

Scheme (FIG. 5)

In this embodiment the plant 1 has the first gas turbine engine 2 and the second gas turbine engine 3 each followed by a heat recovery steam generator 27, 31; these steam generators 27, 31 supply steam to the steam turbine 28.

Each engine 2, 3 has:
a flue gas duct 4, 42,
its own exhaust system 6, 44 and $CO_2$ capture system 5, 43.

In addition:
references 46, 47 indicate the direct connection and the damper between the second engine 3 and the additional exhaust system 44 of the first engine 2,
references 50, 51 indicate the direct connection and the damper between the second engine 3 and the $CO_2$ capture system 43 of the first engine 2,
reference 53 indicates the supply of fresh oxygen containing fluid (air) to the first engine 2.

Advantageously, the first and second engines 2, 3 of this plant 1 can be operated under the same working conditions.

In addition, this plant can also operate without the $CO_2$ capture systems 5, 43.

This scheme permits a reduction of:

$NO_x$ emissions (because less $O_2$ is available to generate $NO_x$), size and costs of the blowers on the flue gas ducts 4, 42 (if provided), alternatively the blowers could also be eliminated (this example is shown in FIG. 5). This is possible because the gas turbine engines 2, 3 have a slightly high back pressure permitting to overcome the pressure drop at the flue gas ducts 4, 42, such that no blowers or blower with a smaller size are needed.

This plant could operate with flue gas recirculation at full load, and with reduced flue gas recirculation or no flue gas recirculation at part load, to improve performance.

Figure 11:
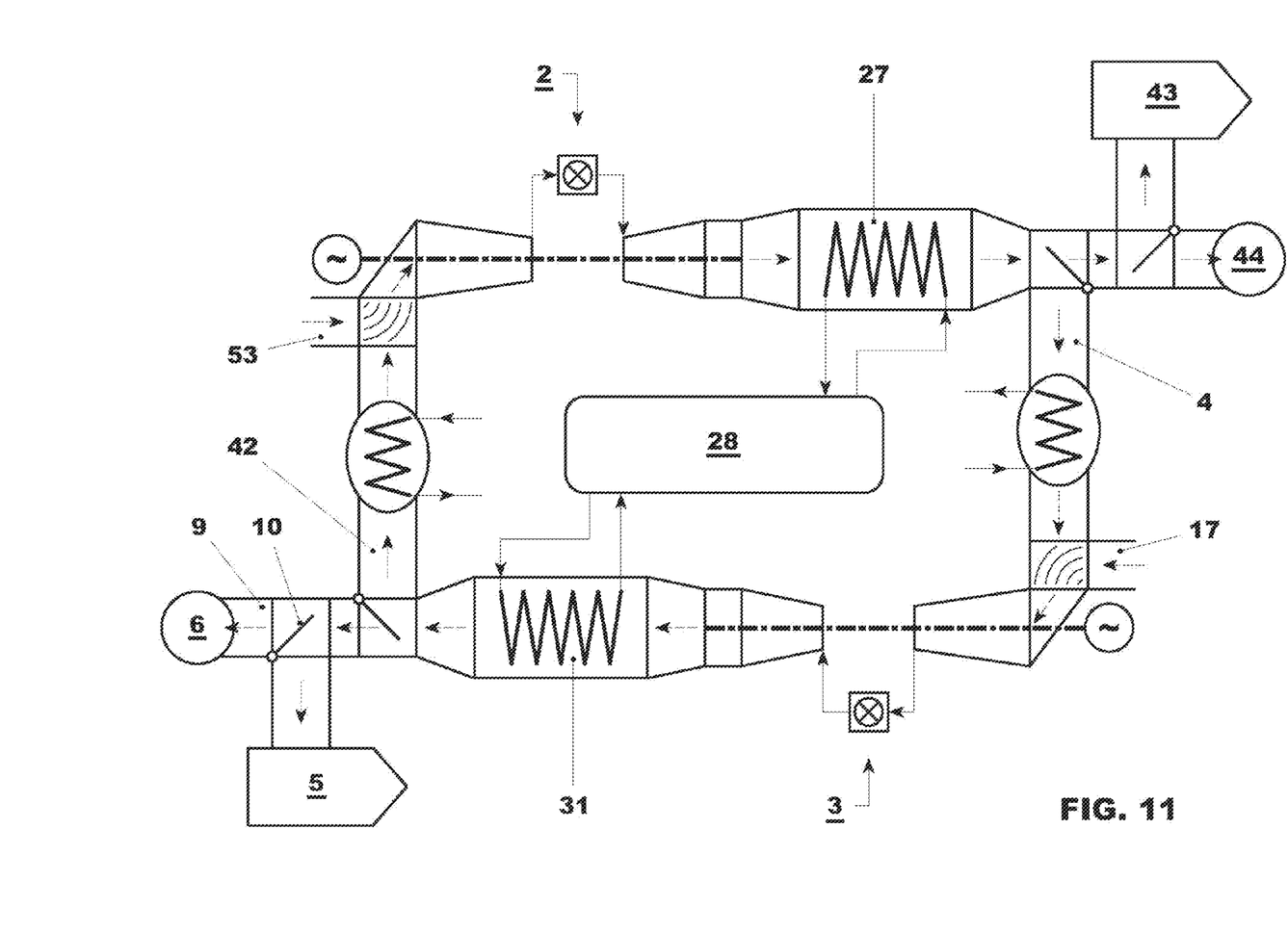
FIG. 11 shows an embodiment of an arrangement.

Arrangement (FIG. 11)

The preferred arrangement of embodiment 7 is shown in FIG. 11. It has two combined cycle gas turbine engines 2 and 3 configured in a tail-head-tail-head closed arrangement, with a semi-closed cycle, because for each engine 2, 3 a supply of fresh oxygen containing fluid (such as fresh air) is provided. In this example, each gas turbine engine 2, 3 extends in opposite direction with respect to the other gas turbine engine 3, 2; in addition they lie parallel to one another. The gas turbine engine 2 faces the exhaust system 6 and the gas turbine engine 3 faces the exhaust system 44.

This arrangement allows reduced costs of the flue gas ducts 4, 42 due to their reduced length.

Embodiment 8

FIG. 6

Figure 6:
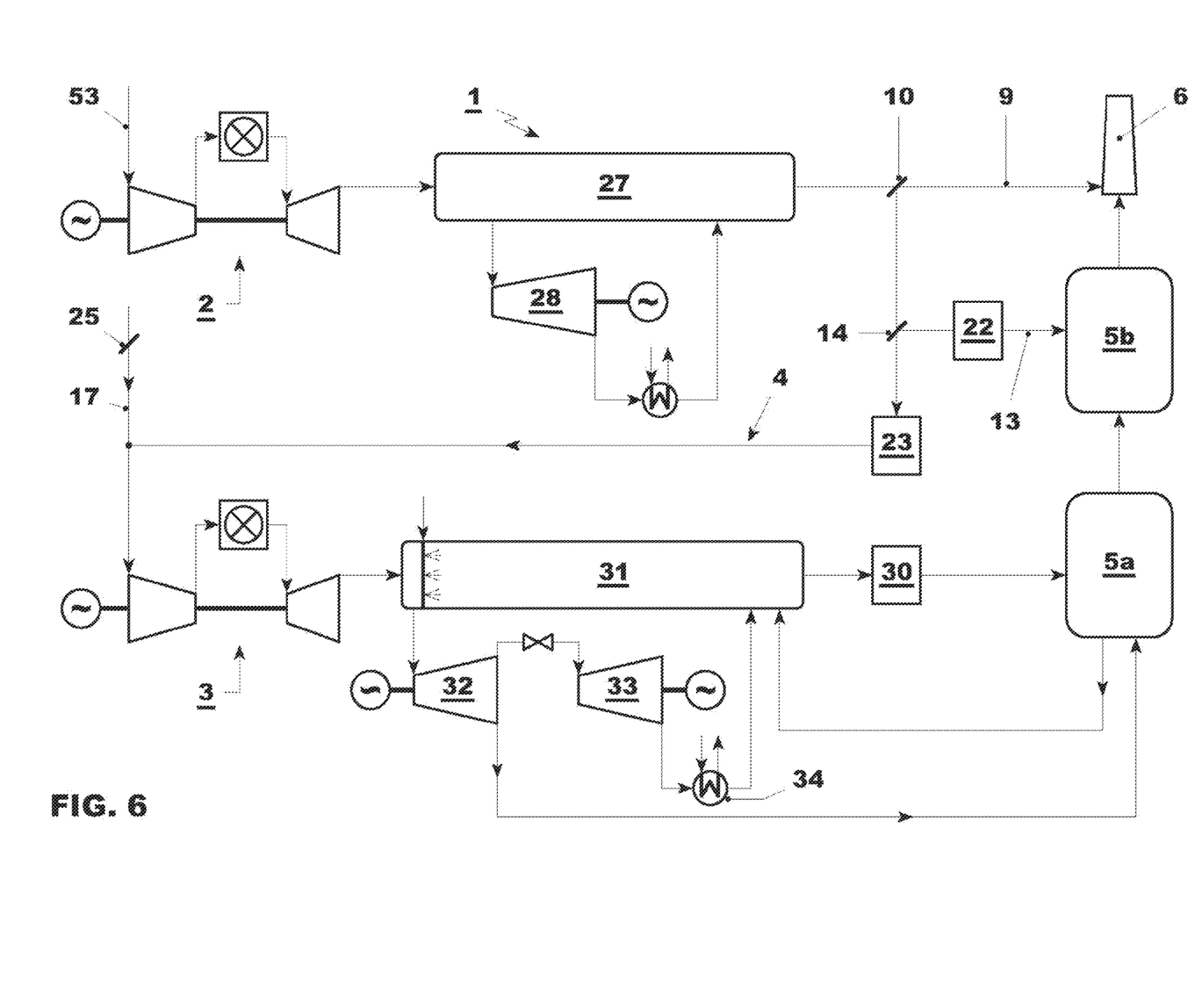

In this embodiment the $CO_2$ capture system 5 includes two smaller units 5a and 5b connected in series; in particular a first unit 5a is supplied with the flue gases from the second gas turbine engine 3 and a second unit 5b is supplied with the flue gases from the unit 5a.

In different examples:
the direct connections 13 can be connected to the first unit 5a, or
the direct connections 13 can be connected to the second unit 5b.

In this embodiment, when the plant 1 operates at part load, the first unit 5a can be regulated to operate at design conditions (while the second unit does not operate or operate at non optimal conditions, the global efficiency is anyhow increased compared to the use of one single large $CO_2$ capture system).

Operation

With particular reference to the embodiment of FIG. 1, the power plant operation is substantially the following.

The first gas turbine engine 2 is supplied with fresh air and fuel that is burnt generating flue gases (and mechanical power used to activate the compressor and an electric generator).

The flue gases from the first engine 2 are supplied to the heat recovery steam generator 27 where they generate steam that is expanded in the steam turbine 28 also connected to an electric generator).

The flue gases emerging from the heat recovery steam generator 27 can be partially or completely directed (according to the operating requirements and conditions):
to the exhaust system 6 via the direct connection 9,
to the $CO_2$ capture system 5 via the direct connection 13,
to the second gas turbine engine 3.

In this embodiment (but this is not mandatory) also fresh air is supplied to the second engine 3; fresh air and flue gases from the first engine 2 are mixed forming a mixture that passes through the compressor and is supplied into the combustion chamber of the second engine. In this combustion chamber also fuel is supplied and burnt, generating flue gases that are expanded in the turbine of the second engine 3 (gathering mechanical power, for example to operate an electric generator) and are then supplied to the heat recovery steam generator 31. The heat recovery steam generator 31 feeds the module 32 with steam; the module 32 in turn supplies steam to the module 33 and/or to the $CO_2$ capture system 5.

The flue gases emerging from the heat recovery steam generator 31 are supplied to the cooler 30 and thus to the $CO_2$ capture system 5 and to the exhaust system 6.

Operating Concept

During operation of a power plant with gas turbines engines 2 and 3 in tandem arrangement (in which the flue gases discharged from the gas turbine engine 2 are supplied to a gas turbine engine 3, like for example shown in the embodiment of FIG. 1), a mismatch between the flue gas generated in the gas turbine engine 2 and flue gases needed at the gas turbine engine 3 exists. Typically the flue gas amount generated at the gas turbine 2 is too large for the needs of the gas turbine 3 because they typically enter the second gas turbine at an elevated temperature compared to the inlet temperature of the first gas turbine.

For this reason, the flue gases generated at the gas turbine engine 2 are matched to the flue gas needed at the gas turbine engine 3 by one or more of the following methods:

a part of the flue gases generated at the gas turbine engine 2 is discharged via the direct connection 9 or the direct connection 13;

the gas turbine engine 3 can be made larger than the gas turbine engine 2, such that it can receive all of the flue gases from the gas turbine engine 2;

the variable guide vanes of the compressor of the second gas turbine are set to a slightly closed position for full load;

a part of the flue gases of the first gas turbine is recirculated into its compressor inlet. Depending on the temperature of the recirculated flue gases the inlet temperature of the first gas turbine is increased due to the recirculation. As a result the mass flow through the first gas turbine is reduced. Additionally the flue gas flow, which enters the second gas turbine, is directly reduced by the recirculated flow. Both reductions are combined to match the first a second gas turbine.

Retrofit

With reference to FIGS. 7-10, a method for retrofit a gas turbine engine is disclosed.

Figure 7:
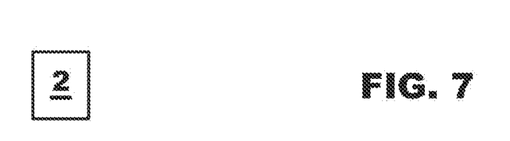
FIGS. 7 through 10 schematically show the steps of the retrofit method.

In this respect FIG. 7 shows a gas turbine engine (having an exhaust system 6) to be retrofitted.

The method comprises the following steps.

Step 1

In a first step (FIG. 8) one or more additional gas turbine engines are provided upstream or downstream of the existing gas turbine engine, such that the existing gas turbine engine defines a first gas turbine engine 2 and the additional gas turbine engine defines a second gas turbine engine or vice versa, wherein the flue gases from the first gas turbine engine are sent to the second gas turbine engine.

In the example of FIGS. 7-10 the engine 2 defines the first engine (it is thus in an upstream position) and the additional engine 3 defines the second engine (it is thus in a downstream position).

Figure 8:
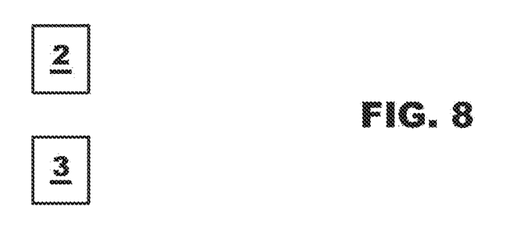
Figure 9:
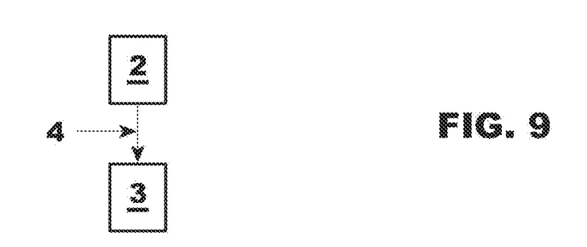

Advantageously, when the existing gas turbine engine is the first gas turbine engine and the additional gas turbine engine is provided downstream of it (it thus defines the second gas turbine engine), the second gas turbine engine is designed for operation with lower $O_2$ concentration than the existing gas turbine engine (flue gas recirculation condition).

Step 2

In a second step (FIG. 9) a flue gas duct 4 for at least partly sending the flue gases from the first gas turbine engine 2 to the second gas turbine engine 3 is provided.

Step 3

In a third step (FIG. 10) a $CO_2$ capture system 5 is provided, the $CO_2$ capture system 5 for treating the flue gases from the second gas turbine engine 3.

In the following, the additional steps 4, 5, 6 are described; according to the method at least one of these steps 4, 5, 6 must be carried out (i.e. not all of them).

Figure 10:
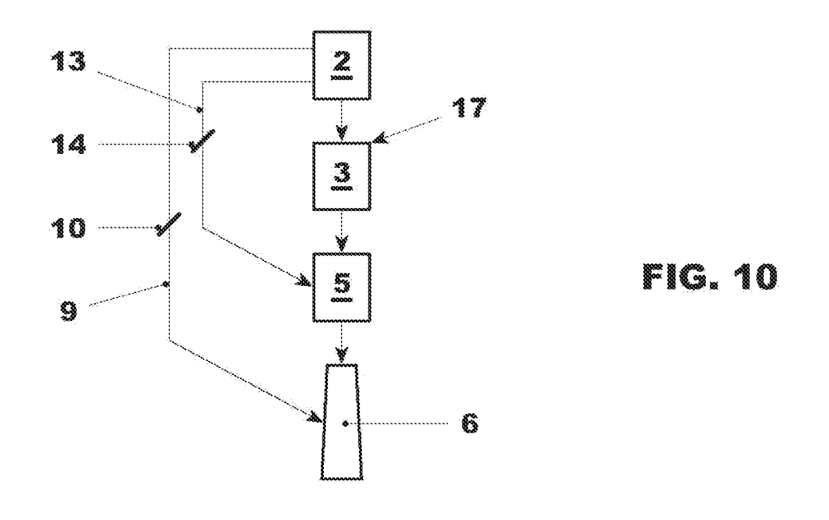

Step 4 (FIG. 10)

In a fourth step a direct connection 9 between the first gas turbine engine 2 and the (existing) exhaust system 6, and a damper 10 for on-line regulating the flue gases flow from the first gas turbine engine 2 to the exhaust system 6 is provided. When needed (i.e. this is not mandatory) also the exhaust system 6 can be replaced with a new exhaust system fitting the requirements of the retrofitted plant.

Step 5 (FIG. 10)

In a fifth step a direct connection 13 between the first gas turbine engine 2 and the $CO_2$ capture system 5, and a damper 14 for regulating (preferably on-line) the flue gases flow from the first gas turbine engine 2 to the $CO_2$ capture system 5 is provided.

Step 6 (FIG. 10)

In a sixth step a supply 17 of fresh oxygen containing fluid for the second gas turbine engine 2 between the first gas turbine engine 2 and the second gas turbine engine 3 is provided.

Naturally the features described may be independently provided from one another.

In practice the materials used and the dimensions can be chosen at will according to requirements and to the state of the art.

It is understood, therefore, that this invention is not limited to the particular embodiments disclosed, but is intended to cover all modifications which are within the spirit and scope of the invention as defined by the appended claims; the above description; and/or shown in the attached drawings.

REFERENCE NUMBERS

1 power plant
2 first gas turbine engine
3 second gas turbine engine
4 flue gas duct
5 $CO_2$ capture system
5a first unit of 5
5b second unit of 5
6 exhaust system
9 direct connection
10 damper
13 direct connection
14 damper
17 supply of fresh oxygen containing fluid
21 cooler
22 cooler
23 cooler
25 mass flow control element
27 heat recovery steam generator
28 steam turbine
30 cooler
31 heat recovery steam generator
32 module
33 module
34 condenser
35, 35a, 35b internal recirculation line
36 outlet
37 inlet
38 connection
42 additional flue gas duct
43 additional $CO_2$ capture system
44 additional exhaust system
46 direct connection
47 damper
50 direct connection
51 damper
53 supply of fresh oxygen containing fluid supply

What is claimed is:

1. A power plant comprising, connected to one another:
a first gas turbine engine,
a second gas turbine engine,
a flue gas duct, for at least partly supplying flue gases from the first gas turbine engine to the second gas turbine engine, a CO₂ capture system for treating flue gases from the second gas turbine engine, and
an exhaust system,
the power plant comprising at least one of:
a direct connection between the first gas turbine engine and the exhaust system, and a damper for on-line regulating the flue gases flowing from the first gas turbine engine to the exhaust system, and
a direct connection between the first gas turbine engine and the $CO_2$ capture system, and a damper for regulating the flue gases flowing from the first gas turbine engine to the $CO_2$ capture system.

2. The power plant according to claim 1, wherein the direct connection between the first gas turbine engine and the $CO_2$ capture system is branched from the flue gas duct.

3. The power plant according to claim 1, comprising:
a supply of fresh oxygen containing fluid for the second gas turbine engine, between the first gas turbine engine and the second gas turbine engine,
wherein the supply of fresh oxygen containing fluid is provided with a mass flow control element for on-line regulating the flow therethrough.

4. The power plant according to claim 1, comprising:
a heat recovery steam generator provided between the first gas turbine engine and the second gas turbine engine.

5. The power plant according to claim 1, comprising:
a heat recovery steam generator connected to one or more steam turbine modules and provided downstream of the second gas turbine engine and upstream of the $CO_2$ capture system.

6. The power plant according to claim 1, wherein the first gas turbine engine and/or the second gas turbine engine comprise outlets and inlets and an internal recirculation line for recirculating flue gases from their outlet to their inlet.

7. The power plant according to claim 6, wherein both the first gas turbine engine and the second gas turbine engine have the internal recirculation line, and in that a connection is provided between them.

8. The power plant according to claim 1, wherein the $CO_2$ capture system comprises:
a first $CO_2$ capture system and a second $CO_2$ capture system connected in series, wherein the first $CO_2$ capture system is connected to the second gas turbine engine and the second $CO_2$ capture system is connected to the first $CO_2$ capture system.

9. The power plant according to claim 1, comprising:
an additional flue gas duct for at least partly supplying the flue gases from the second gas turbine engine to the first gas turbine engine.

10. The power plant according to claim 9, wherein the additional flue gas duct is connected to a supply of fresh oxygen containing fluid for the first gas turbine engine.

11. The power plant according to claim 1, comprising:
an additional $CO_2$ capture system and an additional exhaust system, the additional $CO_2$ capture system for treating the flue gases from the first gas turbine engine.

12. The power plant according to claim 11, comprising at least one of:
a direct connection between the second gas turbine engine and the additional exhaust system, and a damper for on-line regulating the flue gases flow from the second gas turbine engine to the additional exhaust system,
a direct connection between the second gas turbine engine and the additional $CO_2$ capture system, and a damper for regulating the flue gases flowing from the second gas turbine engine to the additional $CO_2$ capture system, or
a supply of fresh oxygen containing fluid for the first gas turbine engine between, the first gas turbine engine and the second gas turbine engine.

13. The power plant according to claim 1, wherein the first gas turbine engine and the second gas turbine engine extend in opposite directions and lie parallel with respect to each other.

14. A method for retrofitting a power plant comprising a gas turbine engine and an exhaust system, the method comprising:
providing at least an additional gas turbine engine, upstream or downstream of the existing gas turbine engine, such that the existing gas turbine engine defines a first gas turbine engine and the additional gas turbine engine defines a second gas turbine engine or vice versa, wherein flue gases from the first gas turbine engine are supplied to the second gas turbine engine,
providing a flue gas duct for at least partly supplying the flue gases from the first gas turbine engine to the second gas turbine engine, and
providing a $CO_2$ capture system for treating the flue gases from the second gas turbine engine,
the method comprising at least one of the following:
providing a direct connection between the first gas turbine engine and an exhaust system, and a damper for on-line regulating the flue gases flowing from the first gas turbine engine to the exhaust system, and
providing a direct connection between the first gas turbine engine and the $CO_2$ capture system, and a damper for regulating the flue gases flowing from the first gas turbine engine to the $CO_2$ capture system.

15. The method according to claim 14, comprising:
providing a supply of fresh oxygen containing fluid for the second gas turbine engine, between the first gas turbine engine and the second gas turbine engine,
wherein the additional gas turbine engine is provided downstream of the existing gas turbine engine and the additional gas turbine engine is designed to be operated with a lower $O_2$ concentration than the existing gas turbine engine.

16. A power plant comprising, connected to one another:
a first gas turbine engine,
a second gas turbine engine,
a flue gas duct, for at least partly supplying flue gases from the first gas turbine engine to the second gas turbine engine,
a $CO_2$ capture system for treating flue gases from the second gas turbine engine, and
an exhaust system,
the power plant comprising:
a direct connection between the first gas turbine engine and the exhaust system,
and a damper for on-line regulating the flue gases flowing from the first gas turbine engine to the exhaust system,
a direct connection between the first gas turbine engine and the $CO_2$ capture system, and a damper for regulating the flue gases flowing from the first gas turbine engine to the $CO_2$ capture system, or
a supply of fresh oxygen containing fluid for the second gas turbine engine, between the first gas turbine engine and the second gas turbine engine; and
wherein the direct connection between the first gas turbine engine and the $CO_2$ capture system is branched from the flue gas duct.

* * * * *